United States Patent [19]

Owen

[11] Patent Number: 4,748,938
[45] Date of Patent: Jun. 7, 1988

[54] ELECTRONIC FLEA REPELLING DEVICE WITH MEANS FOR CARRYING COLLAR STRAP BEHIND THE DEVICE HOUSING

[75] Inventor: Charles W. Owen, Miami, Fla.

[73] Assignee: Elexis Corporation, Miami, Fla.

[21] Appl. No.: 30,909

[22] Filed: Mar. 30, 1987

[51] Int. Cl.$^4$ .......................... A01K 29/00; H04B 1/02
[52] U.S. Cl. ..................................... 119/156; 367/139
[58] Field of Search ........................ 119/29, 106, 156; 24/3 A, 129 B, 200; 40/21 C, 21 R; 367/139; 224/163, 271

[56] References Cited

U.S. PATENT DOCUMENTS

| | | | |
|---|---|---|---|
| 2,449,882 | 9/1948 | Daniels | 24/3 A X |
| 4,484,316 | 11/1984 | Nakagawa | 367/139 |
| 4,612,719 | 9/1986 | de Jong | 119/106 X |
| 4,669,424 | 6/1987 | Bianco et al. | 119/156 |

Primary Examiner—Robert P. Swiatek
Attorney, Agent, or Firm—Lowe, Price, LeBlanc, Becker & Shur

[57] ABSTRACT

Fleas are repelled from a four-legged animal by compressional waves derived from an electric-compressional wave transducer driven by electronic circuitry powered by a battery. The battery, circuitry and transducer are mounted in a housing carried by a collar around the neck of the animal. The housing includes a first face having an aperture covered by a dust screen. A face of the transducer positioned behind the dust screen radiates compressional wave energy through the dust screen that is reflected from the ground beneath the animal back to the underneath portions of the animal. The duty cycle and frequency of ultrasonic pulses derived by the transducer cause the fleas to be repelled. A second face, opposite from the first face, abuts against the body of the animal and carries a frangible, spring-like plate having a pair of slots through which the collar extends. The plate spring properties and the frictional force of the strap in the slots maintain the housing in situ on the neck of the animal, so the compressional waves are directed to the ground. If the animal becomes trapped by the housing, the plate breaks between the slot and an edge of the plate in response to the animal tugging on the trapping agent to enable the animal to escape.

8 Claims, 2 Drawing Sheets

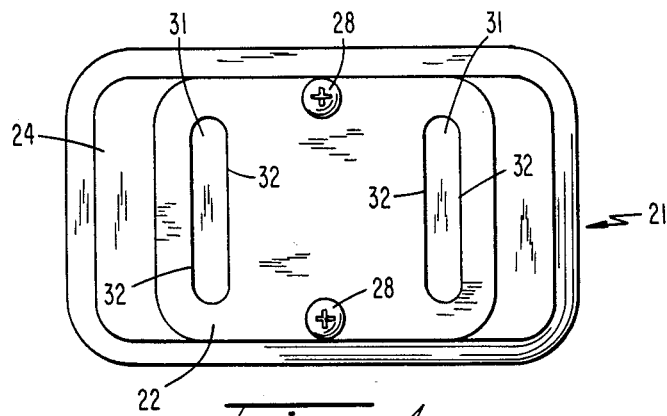
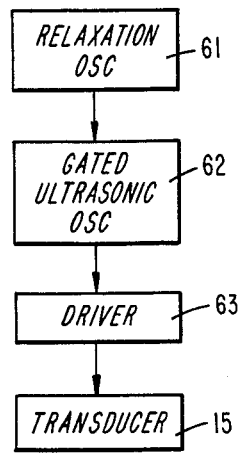
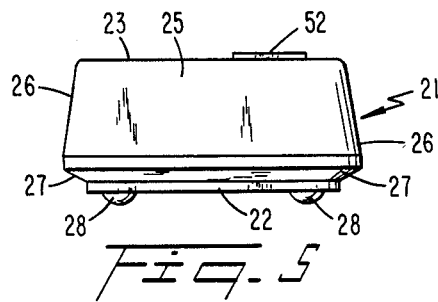
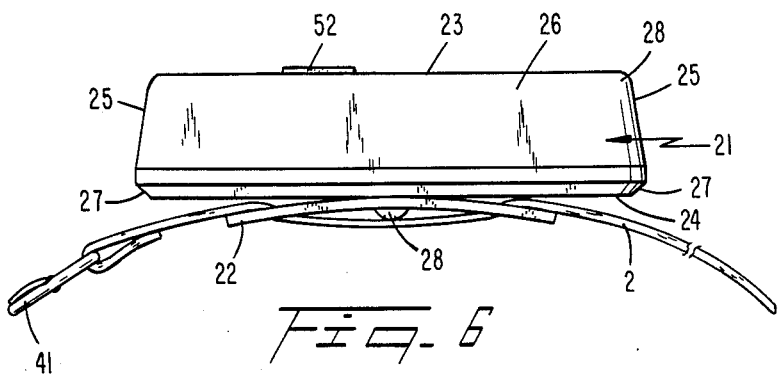

ELECTRONIC FLEA REPELLING DEVICE WITH MEANS FOR CARRYING COLLAR STRAP BEHIND THE DEVICE HOUSING

TECHNICAL FIELD

The present invention relates generally to portable electronic devices mounted on four-legged animals for emitting compressional waves that repel fleas from the animal, and more particularly, to an improved structure for mounting a housing containing such a device so that the strap is secured to the housing against a face of the housing that bears against the body of the animal.

BACKGROUND ART

There is disclosed in the copending, commonly assigned application Ser. No. 742,232, filed June 7, 1985 now U.S. Pat. No. 4,669,424 an apparatus for repelling fleas from the body of domestic animals, such as dogs and cats. The prior art structure includes a housing containing battery means to energize a low duty cycle relaxation oscillator for gating on an ultrasonic oscillator. Oscillations derived by the ultrasonic oscillator drive an electric-compressional wave transducer. The duty cycle and frequency of the relaxation oscillator and the ultrasonic frequency are arranged to repel fleas from a region irradiated by the ultrasonic compressional waves.

The housing containing the battery, electronic circuitry and transducer is mounted on the animal by a collar strap. The housing is mounted on the collar strap so that the compressional waves derived by a radiating face of the transducer are directed downwardly, toward a surface beneath the animal. The compressional waves are reflected from the surface to the underneath parts of the animal. The compressional wave energy incident on the underneath parts of the animal has sufficient intensity to prevent fleas from climbing onto the animal and to drive fleas on the animal from it. For effective operation it is important for the transducer radiating face to face toward the surface beneath the animal.

The prior art housing contains a pair of fixed appendages extending to opposite sides of a central, main part of the housing. Each of the appendages includes a slot through which the collar extends, whereby the collar has a tendency, in certain instances, to slip about the neck of the animal when the housing and strap are secured to the animal by a buckle on the strap. In certain instances, the housing slips around the neck of the animal to such an extent that the compressional wave energy emitted by the transducer is not incident on the surface beneath the vicinity of the animal. Thereby, the intensity of the compressional wave radiant energy incident on the underneath parts of the animal is severely reduced and, in some instances, does not enable the fleas to be repelled from the animal.

Another problem that has been from time to time encountered with the prior art electronic flea repelling collar is that the housing gets hung up on obstacles, to cause the animal carrying the collar to be trapped. The problem is particularly applicable to small dogs and cats in which the housing extends beyond the perimeter of the neck of the animal. It can result in entrapment for prolonged durations, until the animal can be located and released.

It is, accordingly, an object of the present invention to provide a new and improved arrangement for mounting a housing containing a pulsed ultrasonic frequency compressional wave flea repelling structure on a collar strap adapted to be placed around the neck of an animal to be protected from fleas in such a manner that the housing remains in situ on the animal neck at the location where it was originally placed by an installer.

Another object of the invention is to provide a new and improved structure for mounting a housing for a compressional wave source that repels fleas from the vicinity of an animal being protected, wherein the housing is mounted on the animal at a fixed position that is not easily changed to enable the compressional wave energy to be reflected from the ground beneath the animal.

A further object of the invention is to provide a new and improved structure for mounting a housing for a compressional wave source that repels fleas from the vicinity of an animal being protected, wherein the housing is mounted on the animal in such a way that the animal can free itself if it becomes entrapped by the housing hanging up on an obstruction.

DISCLOSURE OF INVENTION

In accordance with one aspect of the present invention, an improved apparatus for repelling fleas from a four-legged animal comprises a housing containing an electric-compressional wave transducer and electronic semiconductor circuitry powered by a battery. The circuitry derives periodic relatively low duty cycle pulses of electric energy that gate on an ultrasonic carrier frequency. The transducer has a radiating face for deriving a compressional wave replica of the periodic pulses and the ultrasonic carrier frequency. The duty cycle and frequency of the pulses and the carrier frequency are selected such that the compressional wave replica repels fleas from a region irradiated by the compressional wave energy. The housing includes a first face having an aperture covered by a dust screen. The transducer radiating face is positioned behind the dust screen so that compressional wave energy radiated from the transducer passes through the dust screen. The housing includes a second face opposite from the first face. Fixedly mounted on the second face is a means for receiving a collar strap adapted to extend around the neck of the animal. The strap receiving means, being mounted on the second face, substantially prevents the housing from slipping about the collar strap. The arrangement of the strap, strap receiving means and housing is such that the housing stays in situ on the neck of the animal so that the radiating face is pointed toward the surface beneath the animal and the compressional wave energy is reflected from the surface beneath the animal back toward the animal to repel fleas from the animal.

In a preferred embodiment of the invention, the strap receiving means includes a spring-like, elastic plate fixedly mounted on the second face. The plate includes a pair of slots approximately equally disposed on opposite sides of a center line of the second face, between end walls of the housing. The plate is preferably made of plastic and secured to the second housing face by any suitable means, such as screws extending through the plastic plate into the housing second face.

It has been found that the stated arrangement enables the housing to remain in situ at the same position where the housing was originally placed on the collar during installation. Because the collar strap is secured in place on the second or back face of the housing and the spring effect of the plate, frictional forces hold the strap and housing in place against the neck of the animal. In addition, the material of the plate and the relative width of the strap and the length of the slots are such that there is relatively great adhesive, frictional force between the strap and the plate; in one preferred embodiment, the plate is formed of polyethylene and the strap is woven fabric.

The plate, being formed of polyethylene or some other frangible material, is broken if the animal becomes trapped by the housing being hung up on an obstacle. The plate is broken between the slot and an edge of the plate in response to the animal tugging on the collar and housing as he pulls away from the obstacle. When the plate breaks the housing is free to turn about the collar strap and the animal is freed from the obstacle. The elastic properties of the plate enable the housing to conform with the necks of pets having diverse perimeter lengths.

The above and still further objects, features and advantages of the present invention will become apparent upon consideration of the following detailed description of one specific embodiment thereof, especially when taken in conjunction with the accompanying drawings.

BRIEF DESCRIPTION OF DRAWING

FIGS. 2, 3, 4 and 5 are respectively top, side cross-sectional, bottom and side views of the housing for the electronic flea repelling device schematically illustrated in FIG. 1;

FIG. 6 is a side view of the housing illustrated in FIGS. 2-5, in combination with a collar strap; and FIG. 7 is a circuit diagram of the electronic circuitry preferably included in the housing of FIGS. 2-6.

BEST MODE FOR CARRYING OUT THE INVENTION

Figure 1:
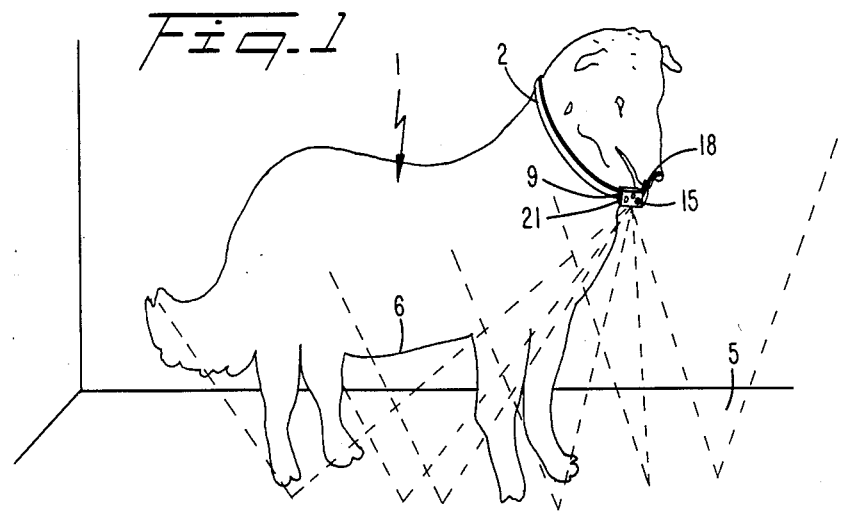
FIG. 1 is a schematic diagram of a dog and flea repelling device in accordance with the present invention mounted on a dog.
Figure 2:
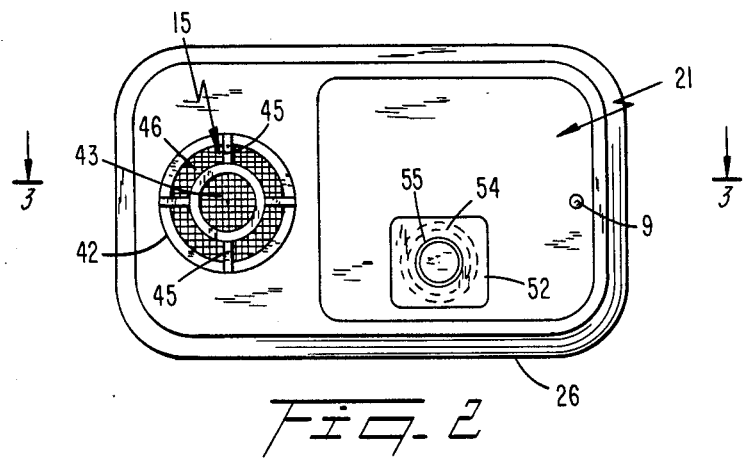

Reference is now made to FIG. 1 of the drawing wherein dog 1 is illustrated as including a woven, nylon fabric neck collar strap 2 on which s mounted housing 21. Contained in housing 21 are an ultrasonic electric signal to compressional wave transducer 15, in the form of a piezo electric crystal. Transducer 15 is driven by electronic circuitry contained in housing 21 and powered by a lithium dry cell battery also contained in the housing. Housing 21 is placed on collar strap 2 around the neck of dog 1 so that ultrasonic compressional waves derived from the emitting face of transducer 15 are directed downwardly away from the dog. The ultrasonic compressional waves are directed in a wide angle beam toward surface 5 on which dog 1 is standing, sitting or lying.

The energy in the compressional wave beam derived from transducer 15 is reflected from surface 5 on which dog 1 is located so that the angle of incidence of the beam impinging on surface 5 is equal to the angle of reflection. Thereby, the ultrasonic compressional wave energy reflected from surface 5 is incident on virtually all of the under parts 6 of dog 1. In one specific embodiment an effective coverage area has a total length of approximately eight feet, with the center of the area of coverage being approximately directly below housing 21. By reflecting the energy of transducer 15 from surface 5, a large coverage area consistent with the under parts of dog 1 is conveniently provided.

The reflected ultrasonic compressional wave energy incident on dog 1 is preferably pulsed at a rate in the audio range of 20 to 300 cycles per second with a relatively low duty cycle of less than 50%, preferably in the range of about 2% to 30%. Each compressional wave pulse derived from transducer 15 has a single ultrasonic frequency, preferably in the 35 KHz-45 KHz range. In tests that have actually been performed these parameters have been found to be effective in repelling fleas and other similar creatures from a very high percentage of dogs who have had the device within housing 21 applied to them.

If the pulse rate is less than about 20 cycles per second, the pest repulsion rate decreases considerably. Also, a pulse rate of less than 20 Hz is not generally perceivable to the human ear to prevent aural techniques from being used to test whether a circuit is operating. The pulsed low duty cycle variations considerably add to the effectiveness of the device in repelling these objectionable pests relative to continuous wave energy. If the duty cycle drops below about 2%, the pest repulsion effectiveness falls virtually to zero. The low duty cycle also reduces the power requirements for the electronic circuitry in housing 21 that drives transducer 15. The 35 KHz-45 KHz frequency range is above the range which can be perceived by the ears of domestic animals, such as dogs and cats, so that the animal is not annoyed by the ultrasonic compressional wave energy emitted by transducer 15. While the power emitted from transducer 15 and reflected back to dog 1 is not adequate to kill the pests on the dog, it is sufficient to repel the pests from the dog. The pests can be killed only if approximately 500 milliamperes are supplied to the electronic circuitry which powers transducer 15. This is not a practical current dissipation level for a portable battery-powered product, such as must be included in housing 21, for effective use over a several month period.

A human can easily perceive whether the electronic circuitry in housing 21 is properly operating and whether the battery energizing the electronic circuit which drive transducer 15 has sufficient power to repel the pests on dog 1. The audio frequency tone derived from transducer 15 can be heard by the vast majority (approximately 85%) of humans if the transducer is placed between 3 and 6 inches from the human ear. Thereby, the vast majority of humans can conveniently detect if the electronic circuitry in housing 21 is properly activating transducer 15.

The intensity level of the ultrasonic compressional wave energy derived by transducer 15 is selectively, inferentially determined as being adequate since a light source, in the form of light emitting diode 9, is mounted in housing 21. If the batteries powering the electronic circuitry which drives transducer 15 has adequate power to provide the pest repulsion function, light emitting diode 9 is energized when spring biased push button switch 18 on the top face of housing 21 is pressed downwardly to a test position from a normal position where the battery power supply in the case is disconnected from the diode. If, however, the battery does not have adequate energy to provide the repulsion function, activation of switch 18 to the test position does not result in energization of light emitting diode 9 and the human is advised that it is necessary to replace the battery.

Reference is now made to FIGS. 2-6 wherein housing 21 for the electronic flea repeller in accordance with the present invention is illustrated, in combination with polyethylene plate 22 through which woven, nylon fabric collar strap 2 extends. Housing 21, plate 22 and collar strap 2 are fabricated in such a manner as to maintain the housing in situ on the neck of dog 1 so that the ultrasonic compressional wave energy is almost invariably directed toward the surface beneath the animal. As discussed supra, the prior art device was constructed in such a manner that there was a tendency, in certain instances, for the housing containing the device to turn on the neck of the animal. When the housing turned on the neck of the animal, the compressional wave energy was not directed toward the surface beneath the ground and the effectiveness of the device was considerably reduced.

Housing 21, preferably constructed of an electrically insulating, molded plastic material formed basically as a right parallelepiped, includes parallel top and bottom faces 23 and 24 with slightly tapered end walls 25 and slightly tapered side walls 26. Walls 25 and 26 are tapered inwardly as they extend from face 24 toward face 23 so that the area of face 23 is slightly less than that of face 24. Walls 25 and 26 have slight outwardly tapered segments 27 abutting against face 24. This shape of housing 21 is aesthetically pleasing and provides a snug fit of the housing on the animal. The entire device has a volume of about 1 cubic inch in a typical embodiment, having a length of about 2 inches, a width of about 1 and one-eighth inch and a height of about one-half inch. Thereby, the device easily is carried by any domestic animal, from a very small dog or cat, to a large dog. Plastic, preferably polyethylene, spring-like, elastic plate 22 is fixedly secured to face 24 by screws 28 which are threaded into threaded bores in posts 61 that are equidistant between the end walls 25 of housing 21.

As illustrated in FIG. 6, strap 2 extends between the face of plate 22 that abuts against face 24 between end walls 25 and slots 31. Strap 2 is threaded through slots 31 from the region between the surfaces of plate 22 and face 24 that abut against each other when the strap is not in situ. Strap 2 is sandwiched between plate 22 and face 24 in the portion of the plate outboard of slots 31, so opposite faces of the strap abut against portions of face 24 and plate 22 outboard of slots 31. Strap 2 extends beneath plate 22 so that the upper face of the strap abuts against the lower face of the plate.

Opposite ends of strap 2 are secured together by conventional buckle fastener 41, of the type including a metal plate with a pair of slots. Buckle 41 positions strap 2 and housing 21 on the neck of dog 1 so housing 21 is positioned at the bottom of the neck of dog 1 to direct compressional wave energy toward the surface beneath the dog.

In use, collar strap 2 is pulled through buckle 41 so that the collar is somewhat tight around the neck of the dog. The neck of the dog exerts a force against the face of plate 22 remote from housing 21 to urge the end portions of the plate against the face of strap 2 proximate thereto. Thereby, opposite faces of strap 2 abut against face 24 and the face of plate 22 outboard of slots 31. The elastic properties of flexible plate 22 urge strap 2 against face 24 to assist in holding housing 21 in situ against the neck of dog 1. The direct application of force by the neck of the dog against plate 22 and the elastic properties of the plate hold housing 21 in situ on strap 2. The width of strap 2 relative to the length of slots 31, the thickness of the strap relative to the width of slots 31 and the adhesive nature of the woven nylon strap against polyethylene plate 22 provide additional frictional forces to assist in holding housing 21 in place on the strap. It has been found through actual tests that the tendency for the housing to turn about collar strap 2 is virtually obviated with the described and illustrated construction.

The specific construction of plate 22 and its relationship to housing 21 are such that collar strap 2 holds the housing in situ on many different size dogs. In large dogs, plate 22 basically stays in place and the described abutting relation between plate 22, strap 2 and face 4 occurs. For small dogs and cats, plate 22 bends longitudinally in the vicinity of end walls 25 but retains the abutting relation in the vicinity of slots 31.

On top face 23 of housing 21 is circular aperture 42 behind which are fixedly mounted dust screen 43 and cone 40, fixedly mounted on a piezo electric crystal which functions as electric-compressional wave transducer 15. Dust screen 43 is preferably a metal grid with apertures between adjacent strands of metal disposed at right angles to each other, in a conventional manner. To prevent dislodgement of dust screen 43, the wall comprising face 23 includes four radially extending arms 45 at mutual right angles to each other. Arms 45 terminate at ring 46, concentric with the circular perimeter of aperture 42 in the wall forming face 23. Arms 45 and ring 46 protect dust screen 44, cone 40 and transducer 15 from external factors which might tend to damage them; exemplary of such factors is the paw of the dog attempting to scratch housing 21. Aperture 43 and the components mounted behind it are located toward one end wall 25 of housing 21.

Light emitting diode (LED) 9 includes an envelope fixedly positioned in an aperture in the wall comprising top face 23. Light emitting diode 9 is connected via suitable leads to printed circuit board 64 located in housing 21. Printed circuit board 64 carries electronic components including relaxation oscillator 61 (FIG. 7) for deriving electric pulses that gate 40 KHz ultrasonic oscillator 62 on at at a frequency in the range of 20-300 Hz with a duty cycle in the range of 2%-30%. Oscillator 62 activates driver 63 for transducer 15.

There is a tendency for housing 21 to be hung up on obstacles, to cause small animals carrying the housing to be trapped. The problem is most noticeable in dogs and cats in which the housing extends beyond the perimeter of the neck of the animal. If the animal is so trapped, it tugs on collar 2 and eventually breaks frangible plate 22, usually between one of slots 31 and the adjacent end or side edge of the plate. When plate 22 is broken, housing 21 turns on collar 2 so that the animal is able to free itself from the obstruction. Generally, housing 21 stays on collar strap 2 after plate 22 has been broken so that the housing is not lost. A new plate is easily installed by the owner of the animal to enable the flea repeller to be returned to service.

Figure 3:
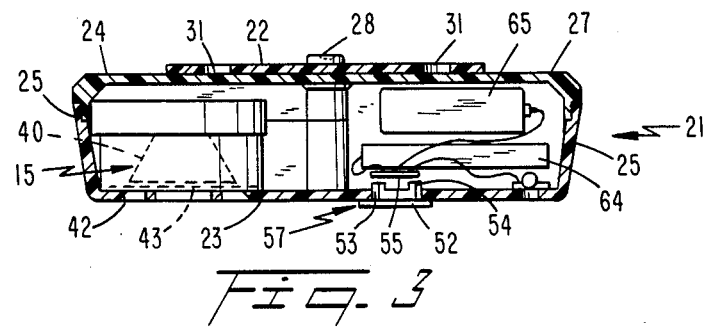

Battery 65 in housing 21 powers electronic circuitry of board 64, transducer 15 and LED 9. To determine if battery 65 has sufficient energy to power the circuitry properly, light emitting diode 9 is activated to produce a visual signal in response to spring biased normally open switch 51 being activated to a closed position by a human operator pressing elastic membrane 52. Membrane 52 covers aperture 53 in the wall including face 23 and has an upper face that is slightly above face 23; the thickness of membrane 52 is slightly exaggerated in the drawing. The underneath face of membrane 52 carries metal ring contact 54. Ring contact 54 is a spring that biases membrane 52 in an upward position, so that contact 54 is normally spaced from stationary, metal disk contact 55, fixedly positioned in housing 21 just below ring contact 54. In response to membrane 52 being depressed by an operator desirous of determining the condition of battery 65, contacts 54 and 55 engage each other. As soon as membrane 52 is released, the spring force of ring contact 54 against the underneath side of membrane 52 causes the membrane to snap upwardly, as illustrated in FIG. 3, so that contacts 54 and 55 become open circuited. Contacts 54 and 55 are connected to circuit components on the integrated circuit, and to light emitting diode 9 so that the diode becomes illuminated in response to contacts 54 and 55 engaging each other if the voltage of the battery is adequate to enable sufficient compressional wave energy to be derived from the speaker for the flea repelling function.

While there has been described and illustrated one specific embodiment of the invention, it will be clear that variations in the details of the embodiment specifically illustrated and described may be made without departing from the true spirit and scope of the invention as defined in the appended claims.

I claim:

1. Apparatus for repelling fleas form a four-legged animal comprising a housing, said housing containing therein: a battery, electronic, semiconductor circuitry powered by the battery for deriving periodic relatively low duty cycle pulses of electric energy, each of the pulses including an ultrasonic carrier frequency, an electric compressional wave transducer connected to be responsive to the periodic pulses, the transducer having a radiating face for deriving a compressional wave replica of the periodic pulses and the ultrasonic carrier frequency; the housing including a first face having an aperture covered by a dust screen, the radiating face being positioned behind the dust screen so that compressional wave energy radiated from the transducer passes through the dust screen, the duty cycle and frequency of the pulses and the frequency of the carrier being such that the compressional wave replica repels fleas from a region irradiated by the compressional wave energy, the housing including a second face opposite from the first face, and means on the second face for receiving a strap adapted to extend around the neck of the animal, said strap receiving means including a pair of slots through which the strap is adapted to extend, said slots being positioned behind the second face so that the housing stays in situ on the neck of the animal and the radiating face faces toward a surface beneath the animal and the compressional wave energy is reflected from the surface beneath the animal back toward the animal to repel fleas from the underneath portion of the animal.

2. The apparatus of claim 1 wherein the strap receiving means comprises an elastic spring-like plate fixedly mounted on the second face for urging the strap in abutting relation with the second face outboard of the slots.

3. The apparatus of claim 2 wherein the plate is frangible so that the plate is broken between one of the slots and the free end adjacent said one slot in response to the dog tugging on the collar while the housing is caught on an obstacle.

4. Apparatus for repelling fleas from a four-legged animal comprising a housing, said housing containing therein: a battery, electronic, semiconductor circuitry powered by the battery for deriving periodic relatively low duty cycle pulses of electric energy, each of the pulses including an ultrasonic carrier frequency, an electric compressional wave transducer connected to be responsive to the periodic pulses, the transducer having a radiating face for deriving a compressional wave replica of the periodic pulses and the ultrasonic carrier frequency; the housing including a first surface having an aperture covered by a dust screen, the radiating face being positioned behind the dust screen so that compressional wave energy radiated from the transducer passes through the dust screen, the duty cycle and frequency of the pulses and the frequency of the carrier being such that the compressional wave replica repels fleas from a region where the compressional wave replica is incident, means for mounting the housing on the neck of the animal so that the compressional waves are directed downwardly and are reflected to underneath parts of the animal, the mounting means including a thin, elastic, spring-like member secured at an intermediate portion thereof to a surface of the housing opposite from the first surface so that free ends of the member are bendable away from the second surface and normally are urged by the elastic spring properties of the member toward the second surface, said member including means for receiving a collar strap for the neck of the animal.

5. The apparatus of claim 4 wherein the strap receiving means comprises a pair of slots adjacent the free ends, said slots extending in a direction at right angles to a line between the free ends, the slots, member and housing being arranged so that the slots are inboard of end walls of the housing and the collar passes between one side of the member and the second surface while extending between the free ends and the slots and abuts against a second side of the member between the slots, the first and second sides of the member being opposite from each other, first and second opposite faces of the strap abutting against the first and second opposite sides of the member.

6. The apparatus of claim 5 wherein the member is frangible so that the member is broken between one of the slots and the free and adjacent said one slot in response to the dog tugging on the collar while the housing is caught on an obstacle.

7. The apparatus of claim 6 wherein the member is a polyethylene plate.

8. The apparatus of claim 4 wherein the member is a polyethylene plate.

* * * * *